May 24, 1949.  N. D. COLVIN  2,471,311

MOWER

Filed Sept. 28, 1944

WITNESS
E. B. Bjurstrom

INVENTOR.
NOLAN D. COLVIN
BY
ATTORNEYS

Patented May 24, 1949

2,471,311

UNITED STATES PATENT OFFICE 2,471,311

MOWER

Nolan D. Colvin, Moline, Ill., assignor to Deere & Company, Moline, Ill., a corporation of Illinois Application September 28, 1944, Serial No. 556,233

3 Claims. (Cl. 56—25)

The present invention relates generally to mowers and more particularly to mowers of the class adapted to be propelled by a tractor or other power driven vehicle. My invention is best adapted to that class of tractor mowers which is supported on its own wheels and trails behind a tractor, although it is not necessarily limited to this type of mower.

Heretofore, mowers of this type have been subject to the objection that when the cutter bar encounters an obstruction in the field during operation, the cutter bar and mower are swung about in a horizontal plane until the wheels of the mower are dragged sideways, plowing into the ground and sometimes causing damage to the equipment. Although this difficulty has been overcome by using caster wheels on the mower, it is then necessary to provide a laterally rigid mounting for the mower frame on the rear of the tractor, for a simple pivot connection in combination with castering wheels would not prevent the ordinary amount of friction between the cutter bar and the ground during normal operation, from dragging the cutter bar rearwardly to a rearwardly inclined position.

The principal object of my invention, therefore, relates to the provision of a wheel supported mower adapted to be connected to a tractor or other draft device by a single draft pin and having wheels that are normally rigidly held in fore and aft extending planes, but which is not subject to the difficulties mentioned above when the mower encounters an obstruction, which swings the cutter bar rearwardly. In the accomplishment of this object I have mounted the cutter bar on a wheel supported frame which is pivotally connected to the draft frame for horizontal swinging movement about a vertical pivot axis, and I provide dirigible wheels for the frame of the cutter bar, which are provided with a novel steering linkage that maintains the wheels in fore and aft extending planes of revolution at all times, even when the mower supporting frame is swung rearwardly due to the cutter bar encountering an obstruction in the field. Thus, the mower rolls smoothly forward even when the cutter bar is in its trailing position.

These and other objects and advantages of my invention will be apparent to those skilled in the art after a consideration of the following description, in which reference is had to the drawings appended hereto, in which Figure 1 is a plan view of a mower embodying the principles of my invention, shown in solid lines in normal operating position, while in broken lines the cutter bar with its supporting frame is shown in its rearwardly trailing position.

Figure 1:
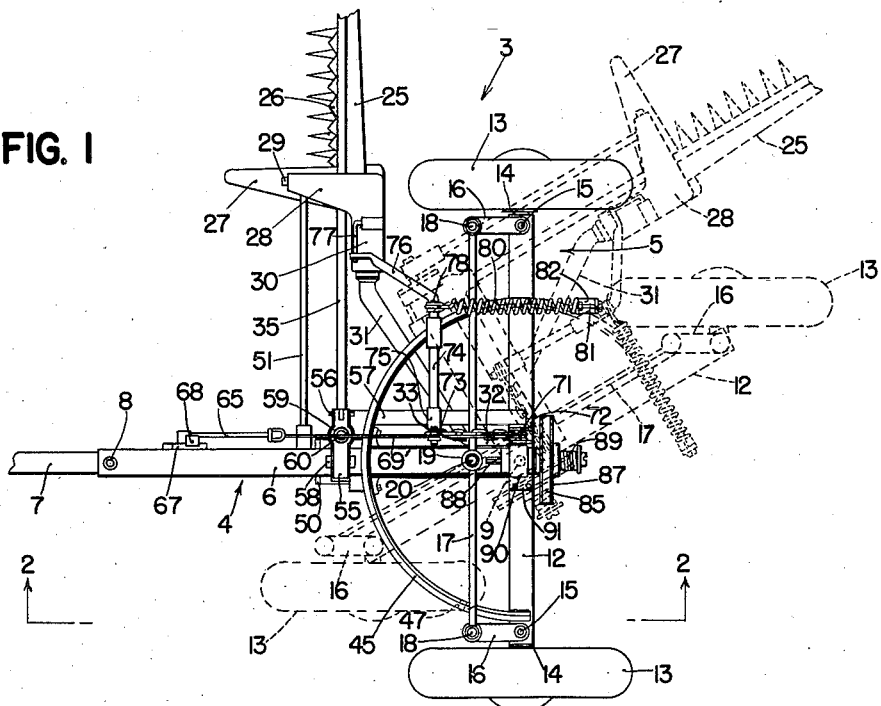
Figure 2:
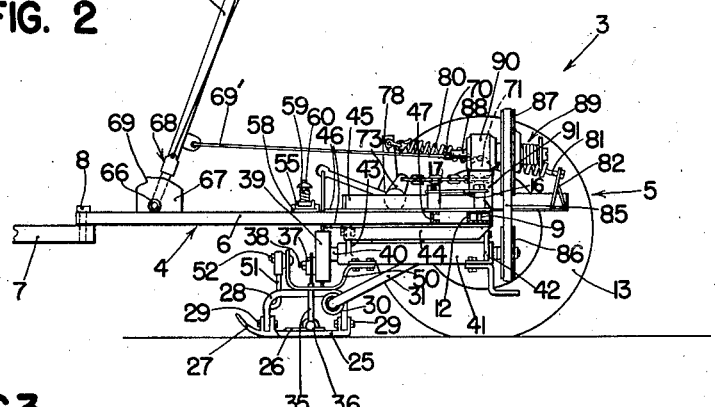
Figure 2 is a side elevational view, taken in section along line 2—2 in Figure 1.
Figure 3:
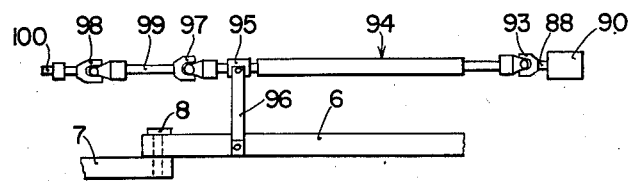
Figure 3 is a side elevational view of the power shaft for transmitting power to the mower from the power take-off shaft of the tractor. This shaft has been omitted from Figures 1 and 2 for the sake of clearness.

Referring now to the drawings, the mower is indicated in its entirety by reference numeral 3 and comprises a draft frame 4 and a cutter bar supporting frame indicated generally by reference numeral 5.

The draft frame 4 comprises a tongue 6 extending fore and aft and is pivotally supported at its forward end on the drawbar 7 of a tractor or other draft vehicle, by means of a draft pin 8 extending vertically through aligned apertures in the adjacent ends of the drawbar 7 and tongue 6, respectively. The rear end of the tongue 6 is pivotally connected to the cutter bar supporting frame 5 by means of a vertical coupling pin 9 providing for relative horizontal angling movement between the two frames 4, 5.

The cutter bar supporting frame comprises a main transversely disposed axle beam 12 in the form of a hollow rectangular structural member, which is pivoted to the rear end of the draft tongue 6 by means of the vertical coupling pin 9, intermediate the ends of the beam 12. At each end of the axle beam 12 is mounted a dirigible ground engaging wheel 13 on which the cutter bar supporting frame 5 is supported. Each of the wheels 13 is journaled on a transverse stub axle 14, which is rigidly fixed to a vertical spindle 15 journaled in the associated end of the axle beam 12. At the upper end of each of the vertical spindles 15 is a steering arm 16 which is rigidly fixed to the spindle and extends horizontally forwardly therefrom. The forward ends of the two steering arms 16 are interconnected by a transverse link 17, the opposite ends of which are pivoted at 18 to the front ends of the arms 16, respectively. The link 17 extends transversely over the draft tongue 6 and is provided with a hub 19 journaled on a vertical pin 20 which is fixed to the draft tongue 6. The two steering arms 16 are preferably equal in length and parallel, as are the link 17 and axle beam 12 between the spindles 15, thus forming a parallelogram. This parallelogram arrangement insures that the wheels 13 are maintained in fore and aft extending parallel planes regardless of the angular position of the axle beam 12 with respect to the draft tongue 6, as indicated by the angled position shown in dotted lines in Figure 1.

The cutter bar 25 can be of any conventional type and is provided with the usual reciprocating knife or sickle 26. The inner end of the cutter bar 25 is mounted on the usual shoe 27, which is pivotally supported on a conventional shoe arch 28 by means of a pair of longitudinally spaced pivot bolts 29 provided for vertical swinging movement of the transverse cutter bar 25 about the fore and aft extending axis of the bolts 29. The cutter bar and shoe are positioned ahead of one of the wheels 13 and the arch 28 is supported on a transverse sleeve portion 30 which is mounted on the end of a supporting arm 31, which inclines inwardly, upwardly, and rearwardly and has a rearwardly turned end portion 33 which is journaled in a bearing 32 for vertical swinging movement about a longitudinally extending axis, in a manner well-known to those skilled in the art, which provides for vertical shifting of the cutter bar 25 and supporting shoe 27.

The sickle 26 is reciprocated by means of a pitman 35 connected by the usual ball and socket joint 36 to the sickle 26 and extending transversely inwardly and having on its inner end a crank bearing 37 which is journaled on a crank pin 38 fixed to the front face of a flywheel 39. The flywheel 39 is mounted on a longitudinally extending drive shaft 40, which is journaled in a fore and aft extending bearing sleeve 41. The rear end of the bearing sleeve 41 is supported on a bracket 42 depending from the main axle beam 12, while the forward end is mounted on a front bracket 43 bolted to the vertical flange of a structural angle member 44, which is bent into a semi-circular arc and rigidly fixed at its opposite ends to the axle beam 12. A similar semi-circular angle member 45 is disposed above the member 44 and is attached at its ends to the top side of the axle beam 12. The vertical distance between the upper and lower semi-circular members 45, 44 is sufficient to provide a slot between the horizontal flanges 46 of the two semi-circular members, which slot receives the draft tongue 6 in sliding relation. The two horizontal flanges 46 are interconnected by a bracket 47 serving as a spacer between the horizontal flanges and also serving as a stop to limit the angular movement between the frames 4 and 5 in one direction. Other spacing members are fixed between the horizontal flanges 46 on the opposite side of the tongue adjacent the cutter bar, for the tongue is never swung into an angle of less than ninety degrees on the side adjacent the cutter bar.

A U-shaped bracket 50 is bolted to the forward end of the sleeve 41 and curves under the flywheel 39, the forward leg serving to support the inner end of a drag link 51 which is pivotally connected to the front leg of the bracket 50 by means of a pivot bolt 52. The outer end of the drag link 51 is connected to the shoe arch 28 and serves to brace the latter against rearward movement on the outer end of the arm 31.

Thus, it is now evident that the cutter bar supporting frame 5 includes the main beam 12, the upper and lower semi-circular guide members 45, 44, the drive shaft supporting sleeve 41, and the U-shaped bracket 50, while the cutter bar 25 is mounted on the frame 5 by means of the arm 31 and drag link 51. The supporting frame 5 together with the cutter bar 25 is swingable horizontally about the vertical axis of the coupling pin 9 relative to the tongue 6. During normal operation, however, the relative angular movement between the frames 4, 5 is restrained by means of a releasable latch mechanism including a latch dog 55 hingedly supported at 56 on a fore and aft extending frame member 57 fixed at its rear end to the transverse beam 12 and fixed near its forward end between the two horizontal flanges 46 of the semi-circular members. The frame member 57 extends forwardly between the semi-circular members 44, 45 to carry the hinge 56. The latch dog 55 engages a lug 58 fixedly mounted on the top of the draft tongue 6 and the latch 55 is urged into engagement with the lug 58 by means of a coil spring 59 which bears against the top of the latch 55 and reacts against a bolt 60 extending downwardly through the spring 59 and anchored to the frame member 57. This type of latch mechanism is well-known to those skilled in the art and can be adjusted by adjusting the bolt 60 to increase or decrease the compression in the spring 59 so that during normal operation the latch holds the cutter bar and its supporting frame in normal operating position with the cutter bar 25 extending transversely of the direction of travel, but when the cutter bar encounters an obstruction in the field, such as a stone or stump which would tend to cause damage to the machine, the excess draft force causes the latch 55 to yield and permit the cutter bar and its supporting frame to swing in a clockwise direction as viewed in Figure 1 toward the trailing position indicated in dotted lines. The link 17 pivots about the vertical axis of the bolt 20 on the tongue 6 and swings the spindles 15 through the arms 16 to hold the wheels 13 in parallel planes extending fore and aft in the direction of travel, thereby avoiding the disadvantage of having the wheels dragged sideways over the ground, as they would do if they were journaled on the axis of the beam 12.

The cutter bar 25 is raised and lowered by means of a control lever 65 pivotally mounted at 66 on a bracket 67 fixed to the side of the draft tongue 6 near the forward end thereof. The lever 65 is provided with a latch device 68 which is engageable with a notch 69 on the forward end of the bracket 67 to hold the cutter bar in raised position for purposes of transport. The lever 65 is connected through a tension rod 69' to a chain 70 which is trained around a sheave 71 journaled on a bracket 72 fixed to the top side of the axle beam 12 adjacent the coupling pin 9. The chain 70 extends forwardly around the sheave 71 and is connected to an arm 73 on a rockshaft 74, which is journaled in a pair of laterally spaced bearings 75 that are mounted on the frame member 57 and on the upper semi-circular guide member 45, respectively. The outer end of the rockshaft is bent forwardly at 76 to provide a lifting arm which is connected through a link 77 to the shoe arch 28 in a manner well-known to those skilled in the art. A vertical arm 78 is rigidly fixed to the rockshaft 74 and is connected to the forward end of a tension spring 80, the rear end of which is anchored by means of a bolt 81 to a bracket 82 extending rearwardly from the transverse beam 12.

Power is transmitted to drive the sickle 26 through the pitman 35, which is journaled on the crank 38, by means of a V-belt 85 trained over a sheave 86 mounted on the rear end of the shaft 40, and is also trained over a drive sheave 87 which is journaled on a drive shaft 88 and is connected thereto by means of a suitable slip clutch mechanism 89 of a type well-known to those skilled in the art. The drive shaft 88 is journaled in a bearing 90 mounted on a bracket 91 which is secured to the top of the axle beam 12 over the coupling pin 9. The forward end of the drive shaft 88 is connected through a universal joint 93 to a power shaft 94 comprising a pair of telescopically related shaft elements. The forward end of the shaft 94 is journaled in a bearing 95 which is swingably supported on the conventional fore and aft swingable standard 96. The forward end of the shaft 94 is connected through a pair of universal joints 97, 98 and a connecting shaft section 99 to the power take-off shaft 100 of the tractor. This type of power shaft connection is well-known to those skilled in the art and is preferably of the type disclosed in Patent 2,349,923 granted to Anderson, Arnold and Paradise, May 30, 1944, to which reference can be made for a detailed description of the power connection.

I do not intend my invention to be limited to the specific details shown and described herein, except as set forth in the claims which follow.

I claim:

1. A mower of the trailing type, comprising a generally longitudinally extending draft tongue having means thereon for a single point of connection on a vertical pivot axis to a source of draft power; a cutter-bar-supporting frame disposed generally transversely to the tongue, and including a laterally extending cutter bar; means including a vertical pivot, spaced longitudinally of the aforesaid pivot axis, for connecting the frame to the tongue for rearward swinging of the frame and cutter bar about said pivot with respect to the tongue when the cutter bar strikes an obstruction and for forward return movement of said frame and cutter bar to normal position when such obstruction is cleared; releasable means connected between the tongue and frame and normally holding the frame and cutter bar against swinging; a wheel-mounting portion on the frame spaced laterally of said vertical pivot and thereby movable generally fore and aft as said frame and cutter bar swing as aforesaid; a ground-engaging wheel steerably mounted on said portion for carrying the frame; and means including a steering link connected to the wheel and pivotally connected to the tongue at a point spaced longitudinally from the aforesaid frame pivot for holding the wheel substantially in straight-ahead position to prevent lateral shifting of the tongue as it trails behind the source of draft power, said link providing for maintaining the wheel in substantially straight-ahead position as it shifts fore and aft when the frame and cutter bar swing rearwardly and return forwardly as aforesaid.

2. A mower of the trailing type, comprising a generally longitudinally extending draft tongue having means thereon for a single point of connection on a vertical pivot axis to a source of draft power; a cutter-bar-supporting frame disposed generally transversely to the tongue, and including a laterally extending cutter bar; means including a vertical pivot, spaced longitudinally of the aforesaid pivot axis, for connecting the frame to the tongue for rearward swinging of the frame and cutter bar about said pivot with respect to the tongue when the cutter bar strikes an obstruction and for forward return movement of said frame and cutter bar to normal position when such obstruction is cleared; releasable means connected between the tongue and frame and normally holding the frame and cutter bar against swinging; a pair of wheel-mounting portions on the frame spaced laterally apart with the aforesaid frame pivot between them and thereby subject to fore and aft movement as said frame and cutter bar swing rearwardly and forwardly as aforesaid; wheels respectively mounted on said portions for carrying the frame; means including steering linkage interconnecting the wheels and connected to the tongue on a vertical pivot spaced longitudinally of the frame pivot, for holding the wheels in substantially straight-ahead positions to prevent lateral shifting of the tongue as it trails behind the source of draft power, said linkage providing for maintaining said wheels in substantially straight-ahead positions as they move fore and aft when the frame and cutter bar swing rearwardly and return forwardly as aforesaid.

3. An implement of the type propelled by a source of propelling power via a force transmitting member having a single point of connection on a vertical pivot axis to the propelling source, comprising a frame disposed generally transversely to the member; means including a vertical pivot, spaced longitudinally of the aforesaid pivot axis, for connecting the frame to the member for rearward swinging of the frame about said pivot with respect to the member and for forward return movement of said frame to normal position; releasable means connected between the member and frame and normally holding the frame against swinging; a wheel mounting portion on the frame spaced laterally of said vertical pivot and thereby movable generally fore and aft as said frame swings as aforesaid; a ground-engaging wheel steerably mounted on said portion for carrying the frame; and means including a steering link connected to the wheel and pivotally connected to the member at a point spaced longitudinally from the aforesaid frame pivot for holding the wheel substantially in straight-ahead position to prevent lateral shifting of the member as it is propelled, said link providing for maintaining the wheel in substantially straight-ahead position as it shifts fore and aft when the frame swings rearwardly and returns forwardly as aforesaid.

NOLAN D. COLVIN.

REFERENCES CITED

The following references are of record in the file of this patent:

UNITED STATES PATENTS

| Number | Name | Date |
| --- | --- | --- |
| 950,604 | Rogers | Mar. 1, 1910 |
| 1,974,410 | Caughey | Sept. 25, 1934 |
| 2,198,910 | Everett | Apr. 30, 1940 |
| 2,225,156 | Coultas | Dec. 17, 1940 |

FOREIGN PATENTS

| Number | Country | Date |
| --- | --- | --- |
| 679,481 | France | Jan. 9, 1930 |